US006476599B1

(12) United States Patent
Czimmek et al.

(10) Patent No.: US 6,476,599 B1
(45) Date of Patent: Nov. 5, 2002

(54) SENSORLESS METHOD TO DETERMINE THE STATIC ARMATURE POSITION IN AN ELECTRONICALLY CONTROLLED SOLENOID DEVICE

(75) Inventors: Perry Robert Czimmek, Williamsburg; Danny Orlen Wright, Cobb's Creek, both of VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/276,225

(22) Filed: Mar. 25, 1999

(51) Int. Cl.[7] .................................................. G01B 7/14

(52) U.S. Cl. ............................ 324/207.16; 324/207.24; 324/207.12; 123/90.11

(58) Field of Search ........................ 324/207.11, 207.24, 324/207.16, 207.12, 207.26, 226, 262; 361/152, 160; 340/644; 251/129.01, 129.15; 123/90.11

(56) References Cited

U.S. PATENT DOCUMENTS

| | | | |
|---|---|---|---|
| 3,671,814 A | 6/1972 | Dick | 317/123 |
| 4,328,526 A | 5/1982 | Dilger et al. | 361/154 |

(List continued on next page.)

FOREIGN PATENT DOCUMENTS

| | | |
|---|---|---|
| DE | 195 05 219 | 8/1996 |
| DE | 196 31 909 | 2/1997 |
| DE | 197 24 900 | 12/1998 |
| DE | 197 36 963 | 1/1999 |
| EP | 0 959 479 | 3/1999 |
| EP | 1 039 102 | 9/2000 |

OTHER PUBLICATIONS

Partial European Search Report; EPO/EP 00 10 22 77; Aug. 8, 2001.

*Primary Examiner*—Jay Patidar

(57) ABSTRACT

A method is provided to determine a static position of an armature 24 of an electronically controlled solenoid device 10. The method provides an electronically controlled solenoid device having a first stator 14 and a first coil 16 operatively associated with the first stator, a second stator 18 and a second coil 22 operatively associated with the second stator, and an armature 24 mounted for movement between the first and second stators. The armature defines a magnetic circuit with each of the first and second stators and their associated coils. A flux of a magnetic circuit associated with each coil is ramped in a generally linear manner over a period of time. A nominal position of the armature is defined where current in both of the coils is substantially equal. A current slope of each of the coils resulting from the associated ramped flux is observed. An offset of each current slope from the nominal position is indicative of the static position of the armature.

19 Claims, 8 Drawing Sheets

U.S. PATENT DOCUMENTS

| | | | | | |
|---|---|---|---|---|---|
| 4,368,501 | A | | 1/1983 | Gingrich | 361/152 |
| 4,515,343 | A | | 5/1985 | Pischinger et al. | 251/48 |
| 4,593,658 | A | | 6/1986 | Moloney | 123/90 |
| 4,823,825 | A | | 4/1989 | Buchi | 137/1 |
| 4,870,364 | A | | 9/1989 | Trox et al. | 324/418 |
| 4,941,348 | A | | 7/1990 | Hock | 73/119 |
| 4,955,334 | A | | 9/1990 | Kawamura | 123/90 |
| 4,957,074 | A | | 9/1990 | Weissler | 123/90 |
| 4,990,854 | A | | 2/1991 | Friz | 324/418 |
| 5,009,389 | A | | 4/1991 | Kawamura | 251/129.1 |
| 5,442,515 | A | | 8/1995 | Wallaert | 361/187 |
| 5,481,187 | A | | 1/1996 | Marcott et al. | 324/207.16 |
| 5,523,684 | A | | 6/1996 | Zimmermann | 324/207.22 |
| 5,578,904 | A | * | 11/1996 | Marcott et al. | 324/207.16 |
| 5,650,909 | A | | 7/1997 | Remele et al. | 361/154 |
| 5,673,165 | A | | 9/1997 | Kuhn et al. | 361/154 |
| 5,691,680 | A | | 11/1997 | Schrey et al. | 335/256 |
| 5,701,870 | A | | 12/1997 | Gottshall et al. | 123/490 |
| 5,708,355 | A | | 1/1998 | Schrey | 323/282 |
| 5,711,259 | A | * | 1/1998 | Pischinger et al. | 123/90 |
| 5,729,119 | A | | 3/1998 | Barbour | 323/222 |
| 5,742,467 | A | | 4/1998 | Schmitz | 361/154 |
| 5,748,433 | A | | 5/1998 | Schrey et al. | 361/210 |
| 5,769,043 | A | | 6/1998 | Nitkiewicz | 123/90.11 |
| 5,775,276 | A | | 7/1998 | Yanai et al. | 123/90.11 |
| 5,785,016 | A | | 7/1998 | Enderle et al. | 123/90.11 |
| 5,797,360 | A | | 8/1998 | Pischinger et al. | 123/90.11 |
| 5,868,108 | A | | 2/1999 | Schmitz et al. | 123/90.11 |
| 5,887,553 | A | | 3/1999 | Ballmann et al. | 123/90.11 |
| 5,991,143 | A | * | 11/1999 | Wright et al. | 361/187 |
| 6,128,175 | A | | 10/2000 | Wright et al. | 361/154 |
| 6,176,207 | B1 | | 1/2001 | Wright et al. | 123/90.11 |
| 6,359,435 | B1 | | 3/2002 | Czimmeck et al. | 324/234 |

* cited by examiner

SENSORLESS METHOD TO DETERMINE THE STATIC ARMATURE POSITION IN AN ELECTRONICALLY CONTROLLED SOLENOID DEVICE

FIELD OF THE INVENTION

This invention relates to an electronically controlled solenoid device and more particularly to a method of determining the static armature position of the solenoid device without the use of sensors.

BACKGROUND OF THE INVENTION

A conventional electromagnetic actuator for opening and closing a valve of an internal combustion engine generally includes a solenoid which, when energized, produces an electromagnetic force on an armature. The armature is biased by a return spring and the armature is coupled with a cylinder valve of the engine. The armature is held by the electromagnet in one operating position against a stator of the actuator and, by de-energizing the electromagnet, the armature may move towards and into another operating position by the return spring.

Conventional high speed electronic solenoid devices of the fuel injector type include an armature movable with respect to a stator to control movement of an injector valve.

In solenoid devices of either an electromagnetic actuator or a fuel injector type, it may be desirable to determine the static armature position relative to the stator for the purposes of mechanical adjustment or to determine the positional status of the armature for diagnostic purposes.

In an electromagnetic actuator, it is often required to space the armature a specific distance between the electromagnets (a mechanical center adjustment). Some conventional methods of the mechanical center adjustment are as follows:

1) During the actuator installation, the armature/stator gap is mechanically measured and necessary adjustments are made. Re-adjustment would require returning to nearly the installation stage of assembly to gain access for mechanical re-measurement or would require the use of a position sensor installed on the actuator.
2) While the actuator is operating, the landing velocity, in open loop control of the armature, is adjusted to be relatively the same on opening and closing, given identical input current profiles. The velocity measurement requires either a laser Doppler sensor or some other reasonably accurate velocity sensor, or position sensor whose signal derivative is used as a velocity.
3) While the actuator is operating, the current, in open loop control, is observed for any de-regulation of level during armature flight. The de-regulation is subjectively used to determine approximate armature offset from some optimal position.

Thus, there is a need to determine the static position of an armature of an electronically controlled solenoid device which does not require use of a sensor, does not require cycling operation of the device and provides for a repeatable set-point after installation.

SUMMARY OF THE INVENTION

An object of the present invention is to fulfill the need referred to above. In accordance with the principles of the present invention, this objective is obtained by providing a method of determining a static position of an armature of an electronically controlled solenoid device. An electronically controlled solenoid device is provided having a first stator and a first coil operatively associated with the first stator, a second stator and a second coil operatively associated with the second stator, and an armature mounted for movement between the first and second stators. The armature defines a magnetic circuit with each of the first and second stators and their associated coils. A flux, of a magnetic circuit associated with each coil is ramped in a generally linear manner over a period of time. A nominal position of the armature is defined where current in both of the coils is substantially equal. A current slope of each of the coils resulting from the associated ramped flux is observed. An offset of each current slope from the current slope of the nominal position is indicative of the static position of the armature.

In accordance with another aspect of the invention, a method of is provided for adjusting a position of an armature of an electronically controlled solenoid device. An electronically controlled solenoid device is provided having a first stator and a first coil operatively associated with the first stator, a second stator and a second coil operatively associated with the second stator, and an armature mounted for movement between the first and second stators. The armature defines a magnetic circuit with each of the first and second stators and their associated coils. A flux of a magnetic circuit associated with each coil is ramped in a generally linear manner over a period of time. A current slope of each of the coils resulting from the associated ramped flux is observed. A substantially identical thereby defining a magnetic center position of the armature.

Instead of ramping the flux and observing current as discussed above, current can be ramped and the rate of change of flux can a observed in accordance with the methods of the invention.

Other objects, features and characteristic of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

DETAILED DESCRIPTION OF THE INVENTION

Figure 1:
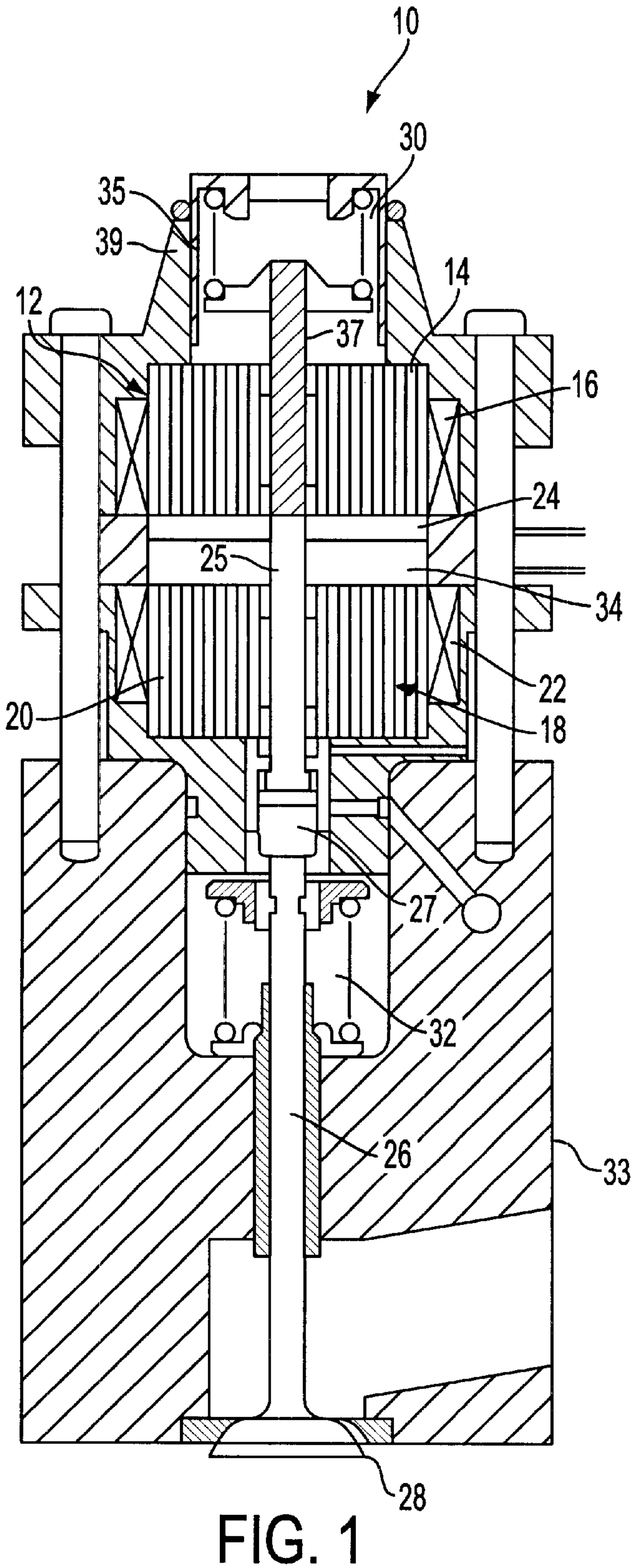
FIG. 1 is a cross-sectional view of a solenoid device, in particular an electromagnetic actuator, provided in accordance with the principles of the present invention, shown coupled with a gas exchange valve of an engine.
Figure 1A:
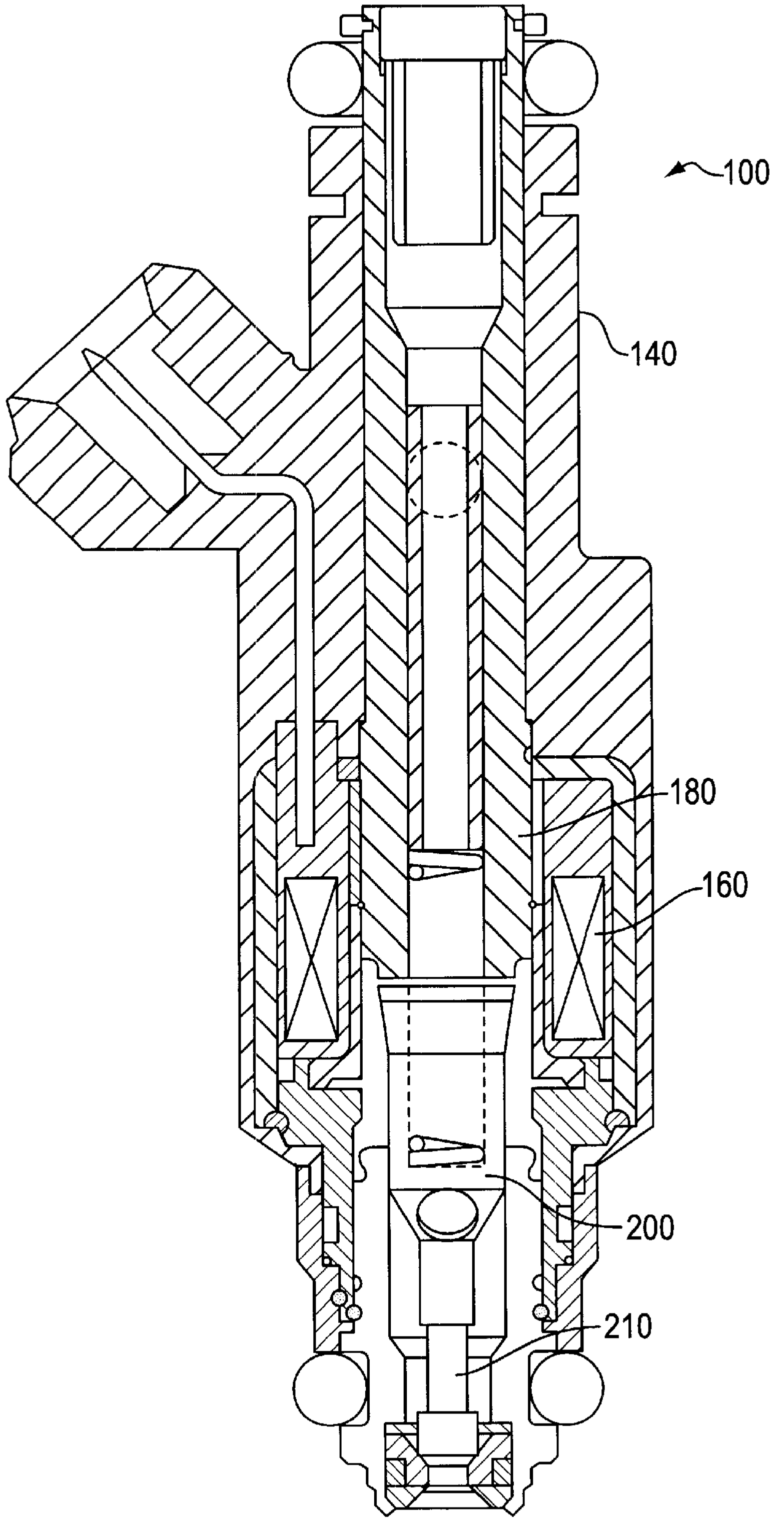
FIG. 1*a* is a cross-sectional view of second embodiment of a solenoid device, in particular an electronically controlled fuel injector, provided in accordance with the principles of the present invention.

Referring to FIG. 1, a solenoid device in the form of an electromagnetic actuator is shown, generally indicated 10, which represents a solenoid device wherein static armature position is determined in accordance with the principles of the present invention. Although an electromagnetic actuator for use in electronic valve timing is shown to represent a solenoid device for the purposes of describing the invention, the invention is not limited to an actuator. The invention relates to any electronically controlled solenoid device such as, for example, a fuel injector 100 as shown in FIG. 1*a*. The fuel injector 100 includes a housing 140 and a magnetic circuit disposed in the housing 140. The magnetic circuit comprises a coil 160, a stator core 180 and an armature 200 coupled with an injector valve 210. The armature 200 moves between first and second positions with respect to the stator core 180 to move the injector valve 210 between open and closed positions.

As noted above, the invention will be described with reference to the electromagnetic actuator of FIG. 1. The electromagnetic solenoid 10 includes a first electromagnet, generally indicated at 12, which includes a stator core 14 and a solenoid coil 16 associated with the stator core 14. A second electromagnet, generally indicated at 18, is disposed generally in opposing relation with respect to the first electromagnet 12. The second electromagnet 18 includes a stator core 20 and a solenoid coil 22 associated with the stator core 20. The electromagnetic actuator 10 includes an ferromagnetic armature 24 which is attached to a stem 26 of a fluid exchange valve 28 through a hydraulic valve adjuster 27 and shaft 25. The armature 24 is disposed generally between the electromagnets 12 and 18 so as to be acted upon by the an electromagnetic force created by the electromagnets. In a de-energized state of the electromagnets 12 and 18, the armature 24 is maintained in a position of rest generally between the two electromagnets 12 and 18 by opposing working return springs 30 and 32. In a valve closed position (FIG. 1), the armature 24 engages the stator core 14 of the first electromagnet 12.

Each stator core and associated coil together with the armature 24 define a magnetic circuit of the actuator 10. Further, as shown in FIG. 1, an air gap 34 is provided between the armature 24 and each electromagnet 18. It can be appreciated that an air gap is defined between the armature 24 and the upper electromagnet 12 at certain times during the oscillation of the armature 24. The air gap 34 is the magnetic discontinuity in a ferromagnetic circuit which increases the reluctance (resistance to flux) of the circuit.

U.S. patent application Ser. No. 09/122,042, now U.S. Pat. No. 5,991,143, entitled "A Method For Controlling Velocity Of An Armature Of An Electromagnetic Actuator", the contents of which is hereby incorporated into the present specification by reference, discloses feedback control of an electromagnetic actuator based on a rate of change of magnetic flux without the need for a flux sensor. In addition, U.S. patent application Ser. No. 09/276,223, entitled "A Method For Determining Magnetic Characteristics Of An Electronically Controlled Solenoid", by inventors Czimmek and Wrights the contents of which is hereby incorporated into the present specification by reference, discloses a method of generating a magnetization curve of an electronically controlled solenoid device with an armature in a static position using closed loop flux control. The invention utilizes closed loop flux control to determine a static position of the armature 24 of the electronically controlled solenoid device 10.

The invention utilizes closed loop flux control to determine a static position of the armature 24 of the electronically controlled solenoid device 10.

Figure 2:
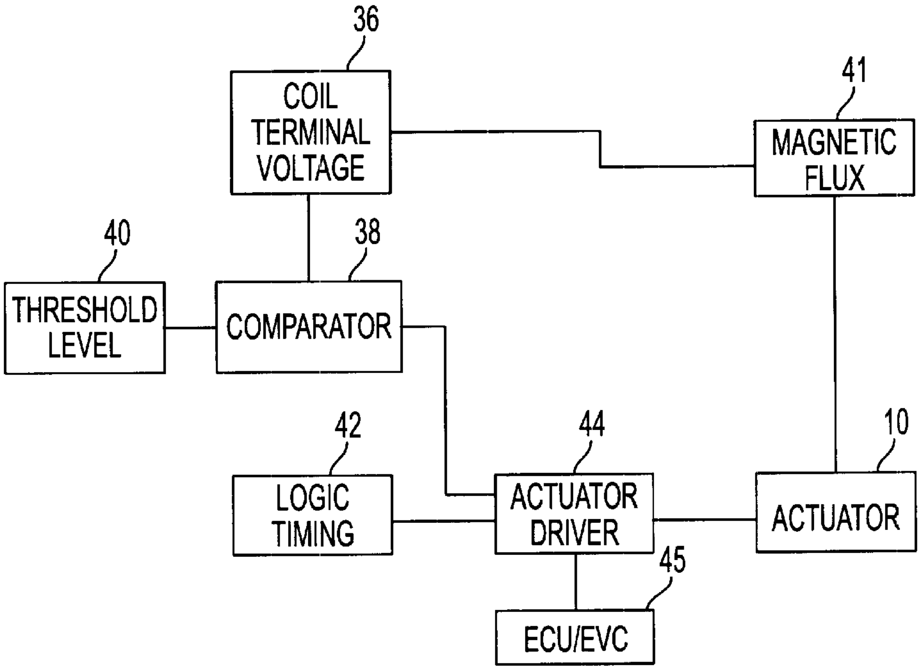
FIG. 2 is a block diagram of circuit structure of the solenoid device of FIG. 1.

With reference to FIG. 2, a block diagram of a circuit structure according to one embodiment of the present invention is shown which incorporates closed loop feedback control of magnetic flux. The circuit structure is based on controlling the armature velocity near landing by ramping or regulating a rate of change of magnetic flux in the armature/stator magnetic circuit by measuring the terminal voltage of the coil 22. In the circuit of the FIG. 2, a terminal voltage 36 of the coil 22 is applied to a comparator 38. A threshold level 40 is also applied to the-comparator 38. The output of the comparator 38 is "logically added" with a logic timing component 42 and is supplied to an actuator driver 44 to drive the actuator 10. Once the actuator driver 44 is energized, the solenoid coil 22 is energized. As used herein, the terms "ramped" or "ramping" denote that magnetic flux is caused to change at a constant rate.

The measured coil terminal voltage 36 is compared to the threshold level 40 and the threshold level 40 is used to control a catch current supplied to the solenoid coil 22 of the actuator 10 and thus control the magnetic flux 41.

Although measuring the coil terminal voltage directly is effective for controlling the landing of the armature 24 of the actuator 10, it is preferable to not physically measure the high common mode voltage typically present at each terminal of the coil 22. Thus, a parametrically determined mirror image of the coil terminal voltage and hence a mirror image of the rate of change of flux in the actuator's magnetic circuit may be provided by the circuit of the actuator 10 such that there is no need to physically touch the coil terminals to measure the coil terminal voltage.

Figure 3:
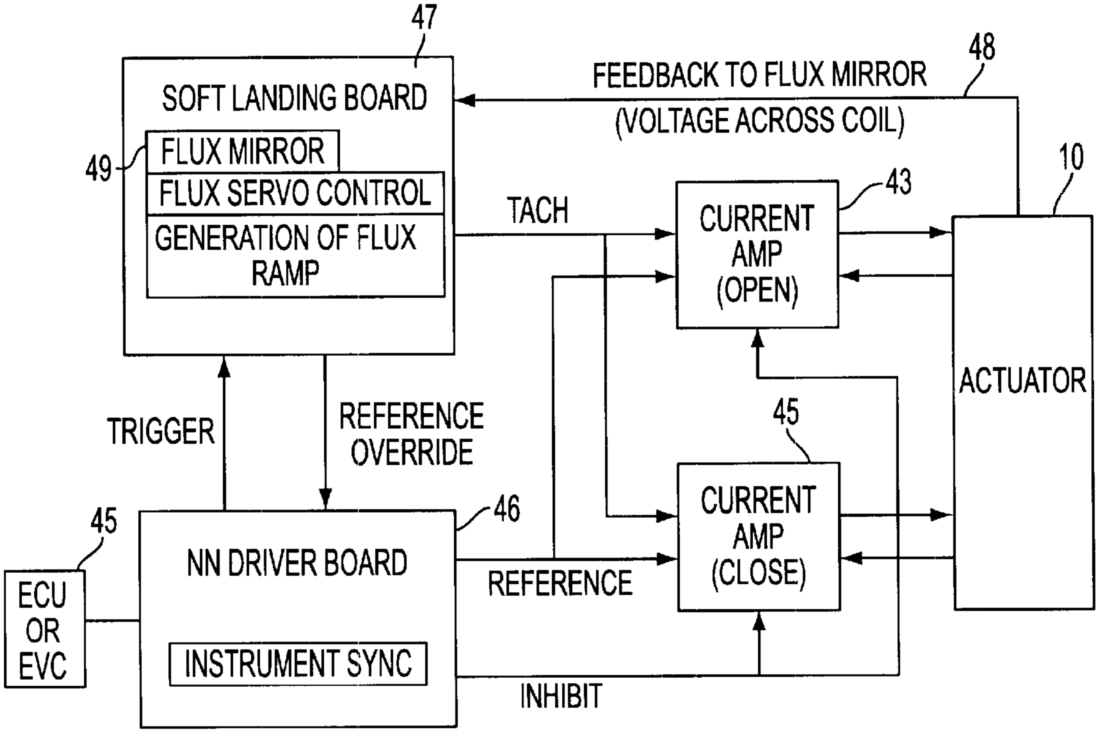
FIG. 3 is a block diagram of a second embodiment of circuit structure of the solenoid device of FIG. 1.

With reference to FIG. 3, a system block diagram for controlling the solenoid or actuator 10 is shown which uses a "flux mirror" circuit. The actuator 10 is electrically connected to an "open" current amplifier 43 and a "close" current amp 45. The current amps 43 and 45 are connected to a programmable current regulator or driver board 46. The programming for controlling current is performed by a soft landing circuit board 47 which commands and regulates the desired rates of change of magnetic flux required to control the magnetic force on the armature 24 of the actuator 10, and therefore, command the flux shape. Closed loop flux regulation is accomplished by feedback of the actuator coil voltage 48 to a flux mirror circuit 49 on the soft landing circuit board 47.

Figure 4:
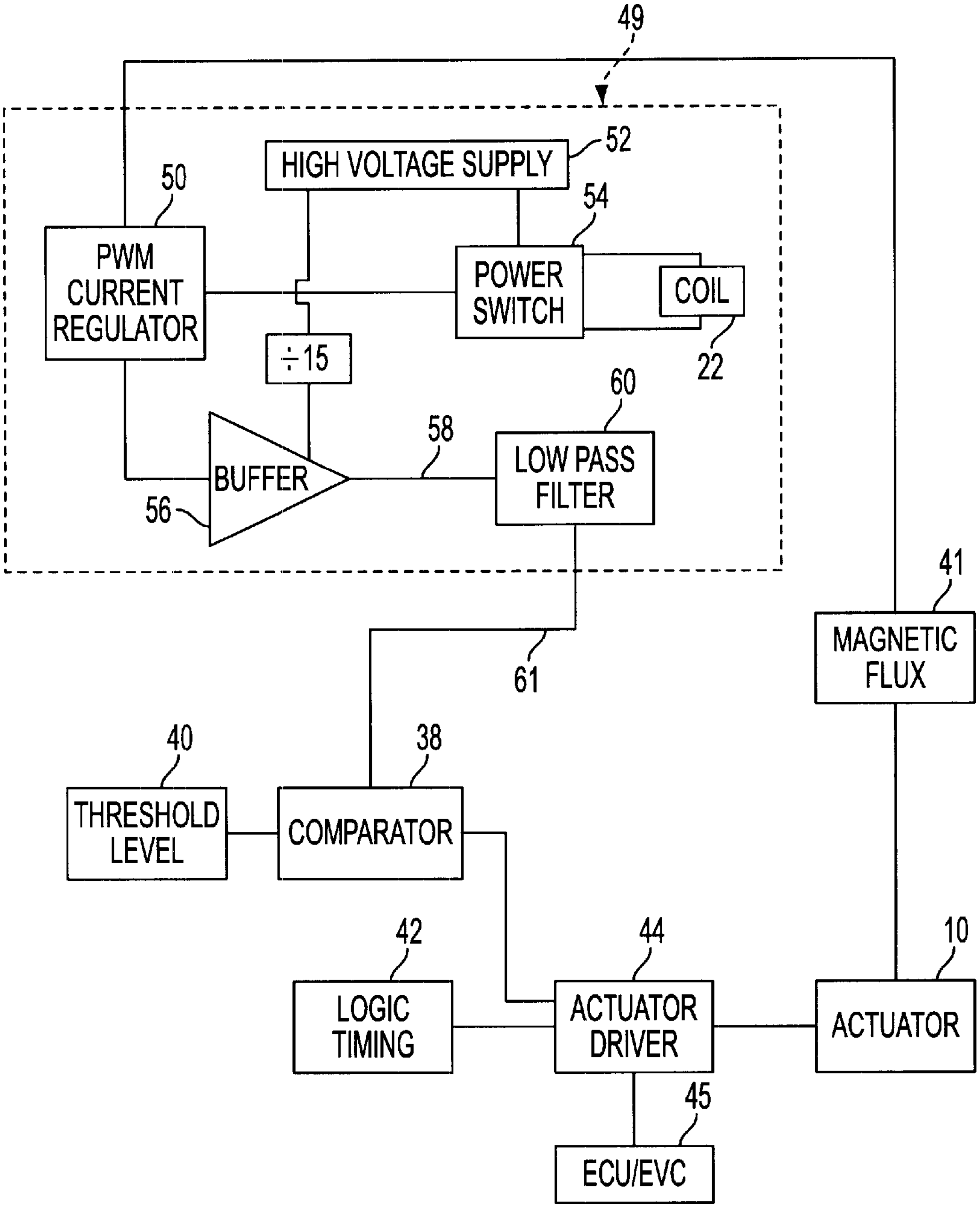
FIG. 4 is a block diagram showing a flux mirror circuit of the circuit structure of FIG. 3.

FIG. 4 shows the flux mirror circuit 49 block diagram of the actuator 10. The solenoid coil 22 of the actuator 10 is driven preferably by a PWM (switchmode) current regulator 50 which provides a pulse train to a high voltage power transistor stage (including a high operating voltage supply 52 and a power switch 54) which subsequently switches voltage pulses across the load of the coil 22. It can be appreciated that power can be regulated by other means, such as, for example, a voltage regulator or amplifier. The flux mirror addition to this conventional approach consists of routing the logic level PWM signal from the current regulator 50 through a buffer 56. The rail voltage of the buffer 56 is derived from a scaled-down replica of the system high voltage supply 52. Finally, the scaled and buffered pulse train 58 is smoothed by a low pass filter 60 and is applied to the comparator 38. The threshold level 40 is also applied to the comparator 38. The output of the comparator 38 is "logically added" with a logic timing component 42 and is supplied to the driver 44 to drive the actuator 10. Once the actuator driver 44 is energized, the solenoid coil 22 is energized. The smoothed pulse train 61 from the low pass filter 60 is compared to the threshold level 40 and the threshold level 40 is used to control a catch current supplied to the solenoid coil 22 of the actuator 10 and thus control the magnetic flux 41.

The time constant of the low pass filter 60 is selected to match the rate of armature motion in the actuator 10. The output from the low pass filter 60 is scaled-down from and mirrors the high operating voltage of the coil 22 and corresponds to the desired time rate of change of magnetic flux d(phi)/dt which is used as a feedback variable to control the landing velocity of the armature 24.

In accordance with the invention, the actuator 10 was connected electrically to the programmable current amplifiers 43 and 45 which are programmed through the soft landing board 47 and the driver board 46. With reference to FIGS. 5–11, the flux was commanded to build linearly up to some convenient maximum, and the current was observed for variation as the static armature position is changed from one position to another.

Figure 5:
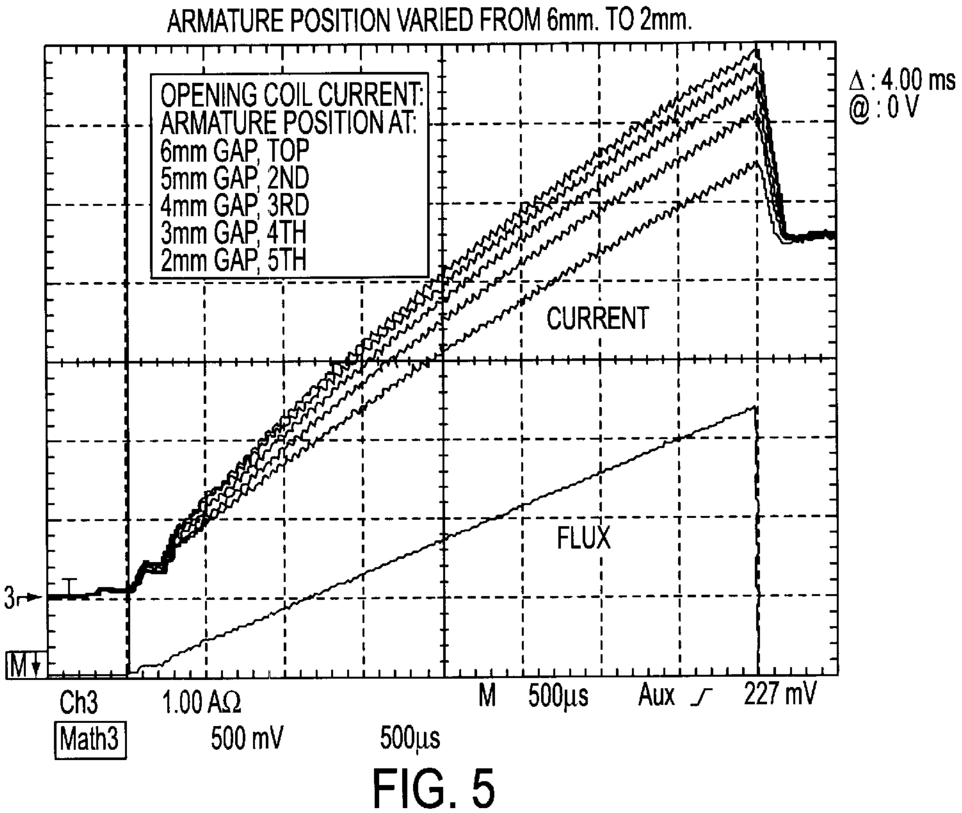
FIG. 5 is a graph of the invention showing ramped flux and responsive current of the opening coil of the solenoid device of FIG. 1, wherein the armature position is varied from 6 mm to 2 mm.
Figure 6:
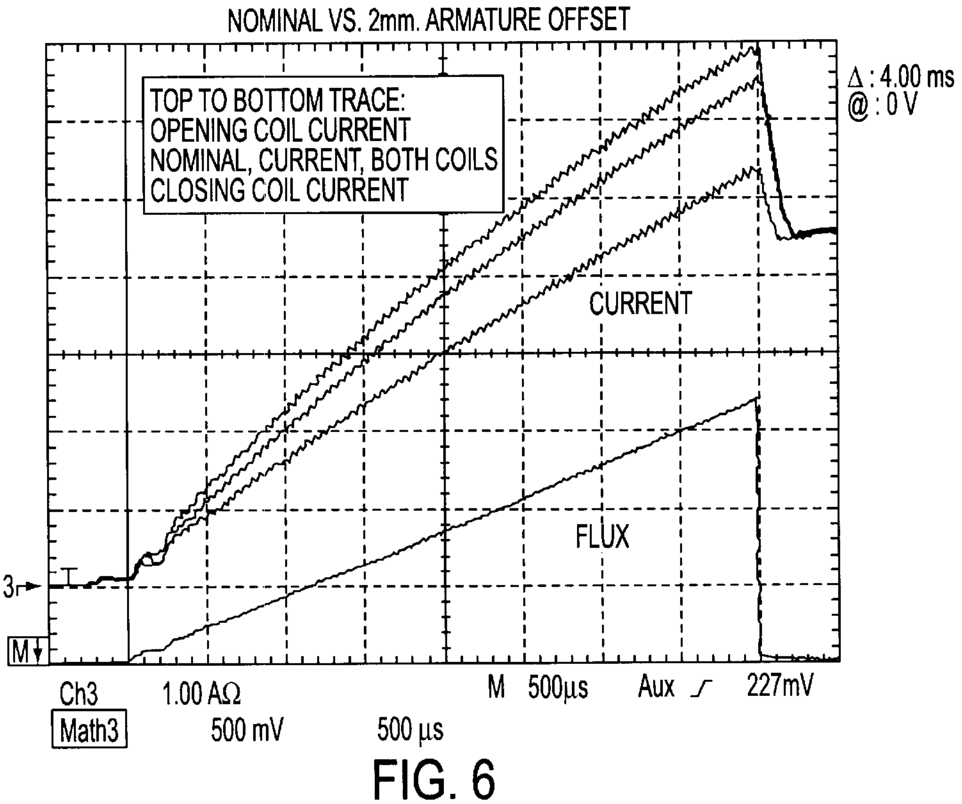
FIG. 6 is a graph of the invention showing ramped flux and responsive current variation of both the opening and closing coils (having equal current) of the solenoid device of FIG. 1 from a nominal position to an offset armature position of 2 mm.
Figure 7:
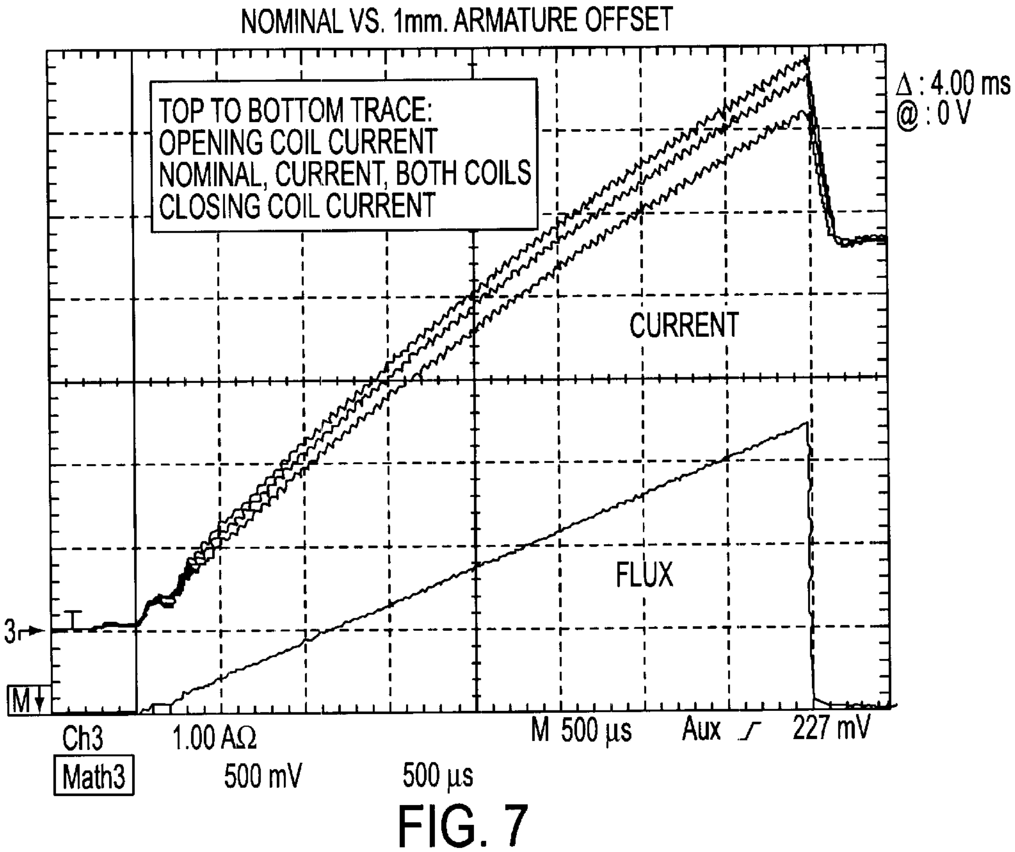
FIG. 7 is a graph of the invention showing ramped flux and responsive current variation of both the opening and closing coils (having equal current) of the solenoid device of FIG. 1 from a nominal position to an offset armature position of 1 mm.
Figure 8:
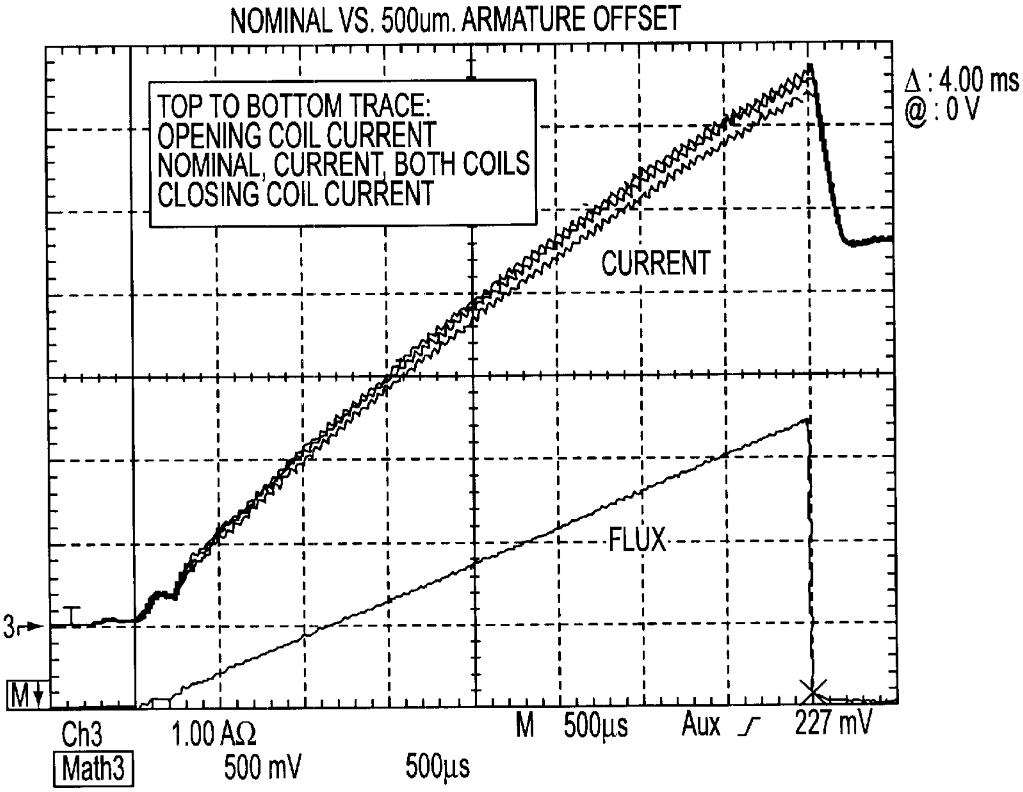
FIG. 8 is a graph of the invention showing ramped flux and responsive current variation of both the opening and closing coils (having equal current) of the solenoid device of FIG. 1 from a nominal position to an offset armature position of 0.5 mm.

In FIG. 5, the current of the opening coil 22 was observed and the armature position was varied in 1 mm increments, from an armature/stator gap 34 of 2 mm to 6 mm. Over the delta of 4 mm, the peak current had a delta of about 1.5 Amperes and a corresponding variation in the slope of the current was observed. In this implementation, a variation of current with armature position variation with a fixed flux profile is demonstrated.

In FIGS. 6–9, both the current of the opening coil 22 and the current of the closing coil 16 were observed and demonstrate the current variation from a nominal position to the offset armature positions of 2 mm, 1 mm, 0.5 mm and 0.25 mm, respectively. The currents of both coils 16 and 22 were equal in the nominal position. It has thus been demonstrated that the movement from a nominal armature position (magnetic center position) to armature offset positions results in the current of opposite coils varying in opposite directions. The current directions of variation are dependent on the direction of the offset of armature position.

Figure 9:
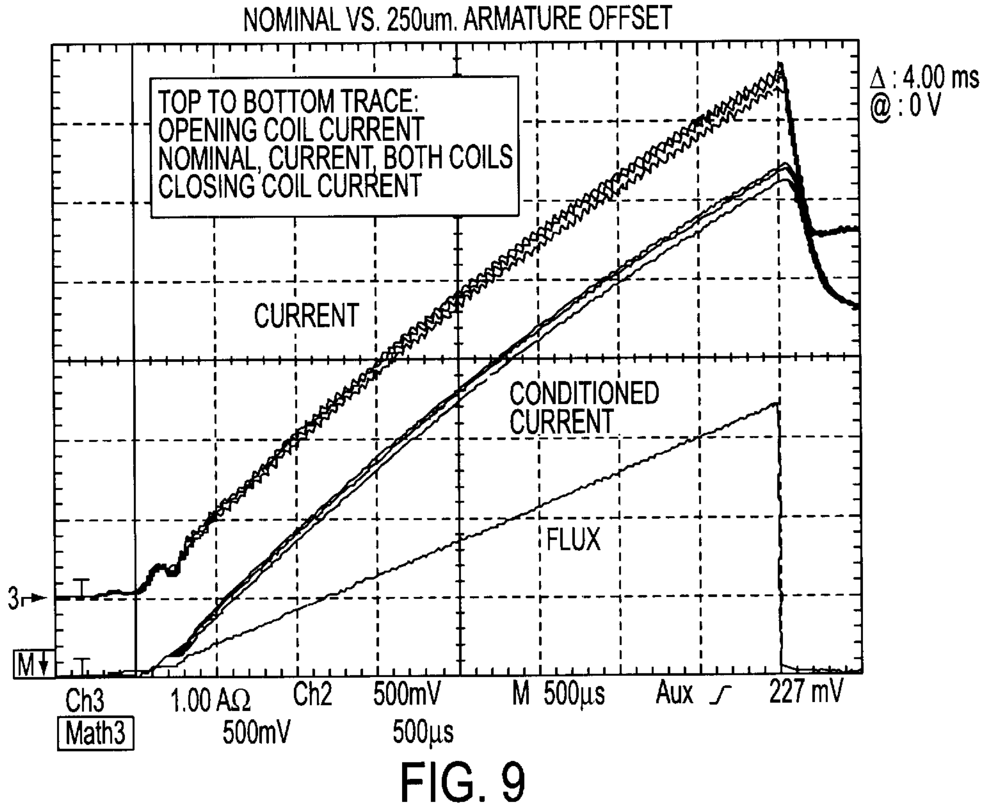
FIG. 9 is a graph of the invention showing ramped flux and responsive current variation of both the opening and closing coils (having equal current) of the solenoid device of FIG. 1 from a nominal position to an offset armature position of 0.25 mm.

Further, FIG. 9 simultaneously displays a conditioned version of the current. This conditioned current version is a voltage scaled at 0.5 Volts per Ampere of current and is filtered to minimize the effect of regulator switching on the observed signal. This new current signal was utilized in FIGS. 10 and 11, to provide greater resolution in the display of current variation. The scaling in FIGS. 10 and 11 is also 0.5V/A, therefore, 50 mV/100 mA per division is displayed.

Figure 10:
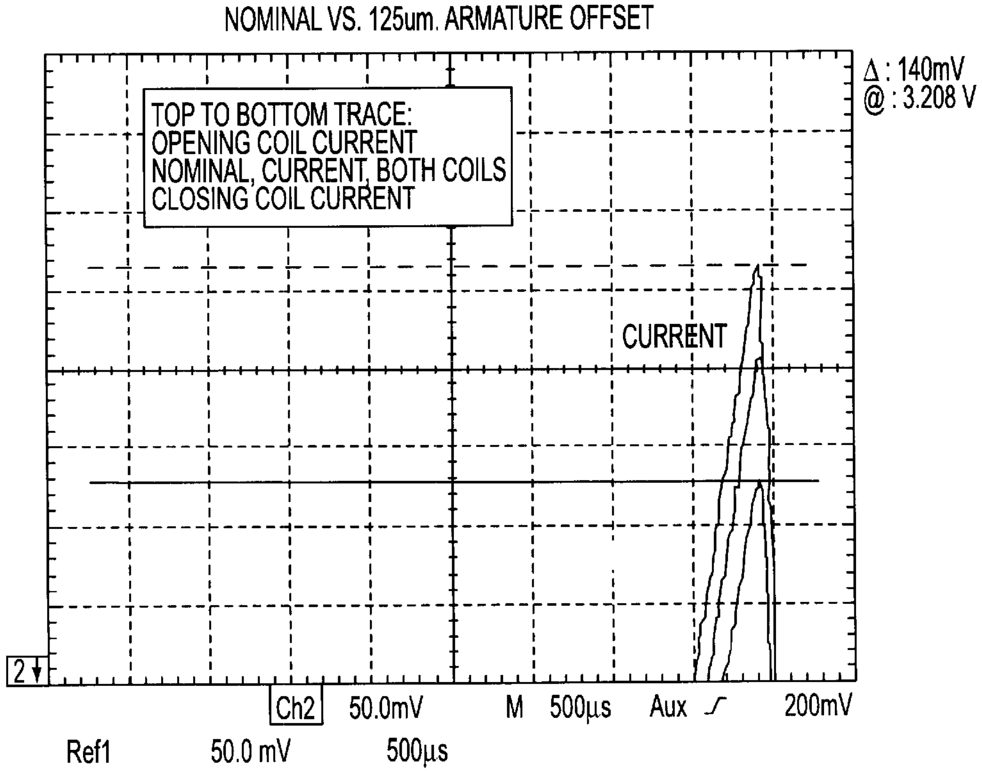
FIG. 10 is a graph of the invention showing ramped flux and responsive current variation of both the opening and closing coils (having equal current) of the solenoid device of FIG. 1 from a nominal position to an offset armature position of 125 microns.
Figure 11:
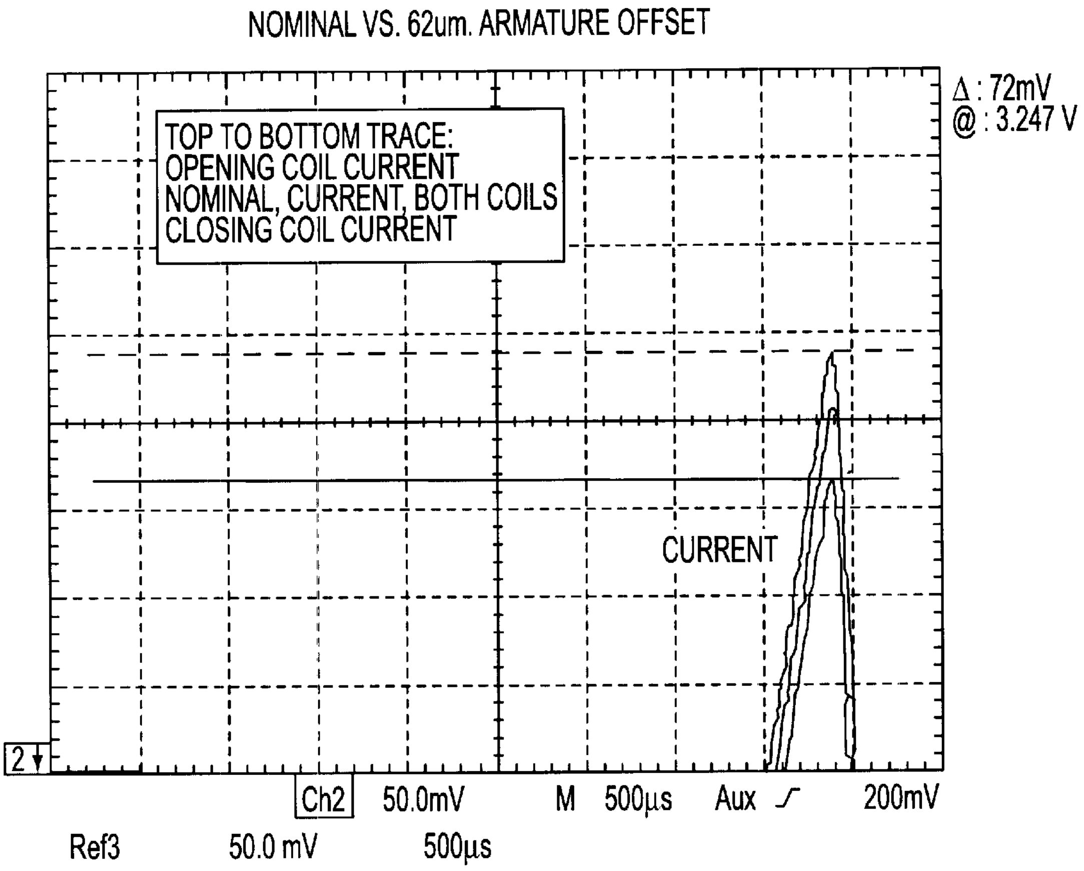
FIG. 11 is a graph of the invention showing ramped flux and responsive current variation of both the opening and closing coils (having equal current) of the solenoid device of FIG. 1 from a nominal position to an offset armature position of 62 microns.

In FIGS. 10 and 11, both the current of the opening coil 22 and the current of the closing coil 16 were observed and the figures demonstrate the current variation from a nominal position (where the currents of both coils 16 and 22 were equal) to the armature offset positions of 125 microns and 62 microns, respectively. Along with demonstrating the variation of current with armature position variation and the directional sensitivity to the direction of armature position variation, the high level of sensitivity of the sensorless method of static armature position determination to a resolution of better than tens of microns is demonstrated.

The "nominal position", referred to above, is the position of the armature 24 where the current in both opening and closing coils is substantially the same to generate substantially the same flux. The "nominal position" is the same as the "magnetic center position" as described below.

In view of the results presented above, a sensorless determination of static armature position in an electromechanical actuator or solenoid device is possible in accordance with the invention based on the demonstrated sensitivity to armature position, sensitivity to direction of armature position variation, and a high resolution of armature position determination.

The determination of static armature position is made possible by using the following basic static relationship:

$$R\phi = NI \qquad \text{(Relationship 1)}$$

Where:

R is reluctance $\phi$ is flux

N is the number of turns of the coil; and

I is current in the coil $$R \alpha D/\mu A \qquad \text{(Relationship 2)}$$

Where:

R is reluctance

D is magnetic gap $\mu$ is permeability; and

A is area

If the number of turns on the coil N, and the flux $\phi$, remain the same, then if the reluctance R (which is a function of magnetic gap D as seen in Relationship 2) changes, the current I, must also change. Likewise, if the number of turns on the coil and the current remain the same, then if the reluctance changes, the flux must also change. The experimental implementation of this invention sets the number of coil turns and the flux as fixed parameters. Therefore, using the above static Relationship 1, any variation in reluctance (gap) results in a variation of current.

Referring to the system block diagram of FIG. 3, in the typical application of this invention, a solenoid or similar electromechanical actuator 10 is connected electrically to a programmable current regulator or current amp. The current programming is performed by the soft landing board 47 in order to command and regulate the desired rate-of-change of flux, and therefore command the flux shape. Closed loop flux regulation is accomplished by feedback of the actuator coil voltage to the flux mirror circuit 49 on the soft landing board 47. Typically, utilizing the basic static relationship, the number of turns on the coil is fixed and the static armature position, and therefore the reluctance, varies. The parameters of flux and current are the remaining controlled or observed variables. Either the flux rate is controlled and a current rate is observed, or a current rate is controlled and the flux rate is observed. Further, the direction of variation, rate of variation, shape of variation, sample points, sample rate, or combinations thereof are not limited to those specifically mentioned herein.

The rate of change of flux may be determined and closed-loop controlled by measuring the terminal voltage of the coil or by using the flux mirror circuit 49 which mirrors the terminal voltage of the coil, as explained above.

For simplicity of explanation, the examples of sensorless determination of armature position described below utilize flux control. The flux was linearly ramped up to some convenient level with respect to each coil, and the slope or level of the resultant current of each coil was the variable observed for armature position determination. With reference to FIG. 1, the armature 24 of actuator 10 provides the motion to open and close the attached valve 28 via the linear moving shaft 25, under the control of two opposing springs 30, 32 and their corresponding opening or closing electromagnets 12 and 18, respectively. The kinetic energy required to move the armature 24 between electromagnet 12 and electromagnet 18 is largely stored in the springs 30 and 32 as potential energy, and the electromagnet coils 16 and 22 provide the extra energy which is lost during each stroke due to friction and gas or fluid work. While the magnetic center position and mechanical center position of the armature 24 should be identical in a perfectly constructed solenoid of this type, due to tolerance and other variables, this is not always the case. Therefore, the adjustment of the armature 24 to the magnetic center position and the adjustment of the armature 24 to the mechanical center position are handled as separate implementations of the invention in the examples below.

EXAMPLE 1

Armature Position Adjustment to the Magnetic Center Position in an Electromagnetic Actuator With the actuator 10 mounted in its final location on the cylinder head 33 (FIG. 1) of an internal combustion engine, the actuator coils 16 and 22 are alternately energized under flux control, via some appropriate engine diagnostic equipment commanding through an Engine Control Unit (ECU) and/or an Electronic Valve Controller (EVC) 45, as shown in FIG. 2 or FIG. 3. The resultant current slopes of each coil were independently averaged over time, to smooth small electronic variations. The resultant averages of each coil's current slopes were compared in real time to provide information to some convenient display. In this example, the actuator 10 had an adjustment screw 35 for adjusting compression of spring 30 and thus adjusting the armature 24 position via shaft 37 which is operatively associated with the armature 24. The screw 25 is adjusted mechanically with respect to the housing 39 until the display indicates current slopes are substantially identical for each coil. In summary, the actuator's armature position can be mechanically adjusted on the cylinder head until, for a desired flux, each coil demands substantially identical current profiles. The actuator 10 is thus set with the armature 24 in a position to provide substantially identical magnetization curves for each coil 16 and 22. Therefore, the armature 24 is in the magnetic center position.

EXAMPLE 2

Armature Position Adjustment to the Mechanical Center Position.

a) Electronic Valve Controller (EVC) Calibration to Pre-measured Actuators.

With the actuator 10 in a final assembly state, prior to installation on the cylinder head 33 of an internal combustion engine and during the electrical quality control stage, the actuator 10 can have its armature 24 placed in the mechanical center position by physically measuring the location of the armature 24 between the electromagnets 12 and 18. The reluctance of the magnetic circuit is then measured for each coil 16 and 22, utilizing an inductance measurement or some other magnetic characterization method. The reluctance data is unique to that actuator 10 with its armature 24 in the mechanical center position. Therefore, the reluctance data must somehow be serialized to the actuator for installation and adjustment. For example, the data can be stored in a data base for access at the time of actuator installation or stored as a number or bar code on the actuator 10 itself. The actuator 10 is then installed on the cylinder head 33 and adjusted in a similar fashion as for the adjustment to the magnetic center position (using the adjustment screw 35), but with the utilization of the stored reluctance data for that actuator to correct the current slopes with the necessary offset for adjustment to the mechanical center position. The Electronic Valve Controller (EVC) 45 is programmed with the offset for each actuator on the engine. Each actuator has its location on the cylinder head 33 recorded, so that during maintenance or repair, the actuator is not separated from the channel the EVC expects that actuator, with its unique characteristics, to be on. If an actuator is replaced, the EVC must be updated with the offset date of the new actuator to insure proper mechanical adjustment.

b) EVC Calibration to Installed and Measured Actuators—Special Cases

As each actuator 10 is installed on the engine cylinder head 33, each actuator has its mechanical center position adjusted and its unique current slope offset is recorded in the EVC 45 for the purpose of re-adjustment during the life of the actuator. This negates the need to physically measure the armature position, but rather allows the use of the sensorless method through the engine diagnostic system. If an actuator is replaced, the EVC must be programmed with a new offset once the new actuator is adjusted by physical measurement.

A special case of actuator adjustment would be the desire of an offset of the armature for optimal operation under certain conditions. This armature offset can be introduced either as a variation of the programming of the pre-measured actuators or an additional offset to be added to the current slopes during armature adjustment. The simplest method would be to adjust the actuator to either the magnetic or mechanical center position and then rotate the adjustment screw some number of degrees to obtain the desired armature position offset.

Another special case of EVC programming would be the use of the current slope offset for the purpose of engine self-diagnosis. The EVC can generate magnetization curves while in some convenient state of operation (startup) and compare the curves to those programmed in the EVC during initial installation and adjustment of the actuators. Any deviation of present curves to original curves could be used to diagnose potential problems, such as the simple need of a "tune-up" to the evidence of possible mechanical failure (ex.: valve spring breakage, armature shaft lockup, etc.).

In the area of solenoids of the fuel injector variety, until the present invention, there existed no practical method of determining the static armature, and therefore, needle position for the purpose of failure detection during the operating life of the injector. This invention provides a sensorless method for the engine controller to determine if the armature of a fuel injector is stuck in an open or closed condition. For example, during the open phase of the injector, a magnetization curve may be generated by ramping the flux up to some current level. This curve is unique if the armature is truly in an open condition against the stator. If, for some reason, the armature is in a position other than full open (e.g., partially open or closed) then the magnetization curve will be different. The fact that it is different indicates an other than normal condition. One does not even need to know what the magnetization curve is in all other armature positions, the presence of a different magnetization curve is sufficient. Likewise, during the close phase of the injector, a magnetization curve may be generated (although at a lower flux level so as to not pull the injector open unintentionally) and any deviation from what is deemed normal would indicate an injector that is not fully closed.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of determining a static position of an armature of an electronically controlled solenoid device, the method including:

providing an electronically controlled solenoid device having a first stator and a first coil operatively associated with said first stator, a second stator and a second coil operatively associated with said second stator, and an armature mounted for movement between said first and second stators, said armature defining a magnetic circuit with each of said first and second stators and their associated coils, ramping a flux of a magnetic circuit associated with each coil in a generally linear manner over a period of time;

defining a nominal position of the armature where current in both of said coils is substantially equal;

observing a current slope of each of said coils resulting from the associated ramped flux;

noting an offset of each current slope from the current slope of said nominal position whereby said offsets are indicative of the static position of said armature; and adjusting a position of said armature between said stators until said current slopes are substantially identical.

2. The method according to claim 1, wherein said solenoid device is an electromagnetic actuator constructed and arranged to operate a fluid exchange valve of an engine.

3. The method according to claim 1, wherein said flux is ramped based on feedback of a terminal voltage of one of said coils.

4. The method according to claim 1, wherein said flux is ramped using feedback of a parametrically determined voltage which mirrors a terminal voltage of one of said coils.

5. A method of adjusting a position of an armature of an electronically controlled solenoid device, the method including:

providing an electronically controlled solenoid device having a first stator and a first coil operatively associated with said first stator, a second stator and a second coil operatively associated with said second stator, and an armature mounted for movement between said first and second stators, said armature defining a magnetic circuit with each of said first and second stators and their associated coils, ramping a flux of a magnetic circuit associated with each coil in a generally linear manner over a period of time;

observing a current slope of each of said coils resulting from the associated ramped flux; and adjusting a position of said armature between said stators until the current slopes of said coils are substantially identical thereby defining a magnetic center position of said armature.

6. The method according to claim 5, wherein said solenoid device is an electromagnetic actuator, said armature being operatively associated with a shaft, said shaft being biased by a spring, said spring being operatively associated with an adjusting member threadedly engaged with a housing of said actuator, the step of adjusting said armature including turning said adjusting member to change a compression of said spring and thus move said armature via said shaft.

7. The method according to claim 5, wherein said flux is ramped based on feedback of a terminal voltage of one of said coils.

8. The method according to claim 5, wherein said flux is ramped using feedback of a parametrically determined voltage which mirrors a terminal voltage of one of said coils.

9. A method of adjusting a position of an armature of an electronically controlled solenoid device, the method including:

providing an electronically controlled solenoid device having a first stator and a first coil operatively associated with said first stator, a second stator and a second coil operatively associated with said second stator, and an armature mounted for movement between said first and second stators, said armature defining a magnetic circuit with each of said first and second stators and their associated coils, adjusting a position of the armature between the stators to a mechanical center position;

measuring and storing the reluctance of each coil after the armature is in the mechanical center position;

installing the electronically controlled solenoid device on a cylinder head of an engine, and ramping a flux of a magnetic circuit associated with each coil in a generally linear manner over a period of time;

observing a current slope of each of said coils resulting from the associated ramped flux; and adjusting the position of the armature and using the stored reluctance data to ensure that the current slopes correspond to the mechanical center position.

10. The method according to claim 9, wherein said armature is operatively associated with a shaft, said shaft being biased by a spring, said spring being operatively associated with an adjusting member threadedly engaged with a housing of said actuator, the step of adjusting said armature including turning said adjusting member to change a compression of said spring and thus move said armature via said shaft.

11. The method according to claim 9, wherein said flux is ramped based on feedback of a terminal voltage of one of said coils.

12. The method according to claim 9, wherein said flux is ramped using feedback of a parametrically determined voltage which mirrors a terminal voltage of one of said coils.

13. A method of adjusting a position of an armature of an electronically controlled solenoid device, the method including:

providing an electronically controlled solenoid device having a first stator and a first coil operatively associated with said first stator, a second stator and a second coil operatively associated with said second stator, an armature mounted for movement between said first and second stators, installing the electronically controlled solenoid device on a cylinder head of an engine, adjusting a position of the armature between the stators to a mechanical center position, recording one of a current slope and flux slope of at least one said coils in a controller when said armature is in the mechanical center position such that during the life of the actuator, the stored current slope or flux slope may used to determine whether the armature remains in the mechanical center position.

14. The method according to claim 13, wherein said armature is operatively associated with a shaft, said shaft being biased by a spring, said spring being operatively associated with an adjusting member threadedly engaged with a housing of said actuator, the step of adjusting said armature including turning said adjusting member to change a compression of said spring and thus move said armature via said shaft.

15. A method of adjusting a position of an armature of an electronically controlled solenoid device, the method including providing an electronically controlled solenoid device having a first stator and a first coil operatively associated with said first stator, a second stator and a second coil operatively associated with said second stator, an armature mounted for movement between said first and second stators, said armature defining a magnetic circuit with each of said first and second stators and their associated coils, ramping current of each of said coils in a generally linear manner over time, observing a flux slope of each of the coils resulting from the ramped current; and adjusting a position of said armature between said stators until the flux slopes of said coils are substantially identical such that said armature is in a magnetic center position.

16. The method according to claim 15, wherein said armature is operatively associated with a shaft, said shaft being biased by a spring, said spring being operatively associated with an adjusting member threadedly engaged with a housing of said actuator, the step of adjusting said armature including turning said adjusting member to change a compression of said spring and thus move said armature via said shaft.

17. A method of determining a position of an armature of an electronically controlled fuel injector, the method including:

providing an electronically controlled fuel injector having a stator and a coil operatively associated with said stator, an armature mounted for movement between first and second positions with respect to said stator, an injector valve operatively associated with said armature for movement therewith, said armature defining a magnetic circuit with said stator and associated coil, ramping a flux of the magnetic circuit in a generally linear manner when said armature is in said first position, observing a current slope of said coil resulting from said ramped rate of change of flux, operating said fuel injector and then stopping operation of the fuel injector when said armature is believed to be in said first position thereof, again ramping a flux in the magnetic circuit in a generally linear manner when said armature is believed to be in said first position and observing another current slope of said coil resulting from said again ramped rate of change of flux; and comparing said current slope with said another current slope to determine whether said armature is actually in said first position thereof.

18. A method of determining a position of an armature of an electronically controlled fuel injector, the method including:

providing an electronically controlled fuel injector having a stator and a coil operatively associated with said stator, an armature mounted for movement between first and second positions with respect to said stator, an injector valve operatively associated with said armature for movement therewith, said armature defining a magnetic circuit with said stator and associated coil, ramping current of said coil in a generally linear manner when said armature is in said first position, observing a first rate of change of flux in the magnetic circuit resulting from said ramped current, operating said fuel injector and then stopping operation of the fuel injector when said armature is believed to be in said first position thereof, again ramping current of said coil in a generally linear manner when said armature is believed to be in said first position and observing a second rate of change of flux of the magnetic circuit resulting from said again ramped current; and comparing said first rate of change of flux with said second rate of change of flux to determine whether said armature is actually in said first position thereof.

19. A method of adjusting a position of an armature of an electronically controlled solenoid device, the method including:

providing an electronically controlled solenoid device having a first stator and a first coil operatively associated with said first stator, a second stator and a second coil operatively associated with said second stator, and an armature mounted for movement between said first and second stators, said armature defining a magnetic circuit with each of said first and second stators and their associated coils, adjusting a position of the armature between the stators to a mechanical center position;

measuring and storing the reluctance of each coil after the armature is in the mechanical center position;

installing the electrically controlled solenoid on a cylinder head of an engine, and ramping current of each coil in a generally linear manner over a period of time;

observing a flux slope of a magnetic circuit associated with each of said coils resulting from the associated ramped current; and adjusting the position of the armature and using the stored reluctance data to ensure that the flux slopes correspond to the mechanical center position.

* * * * *